June 10, 1930. B. B. THOMAS ET AL 1,763,188
FLUSHING VALVE
Filed Sept. 7, 1927 2 Sheets-Sheet 1
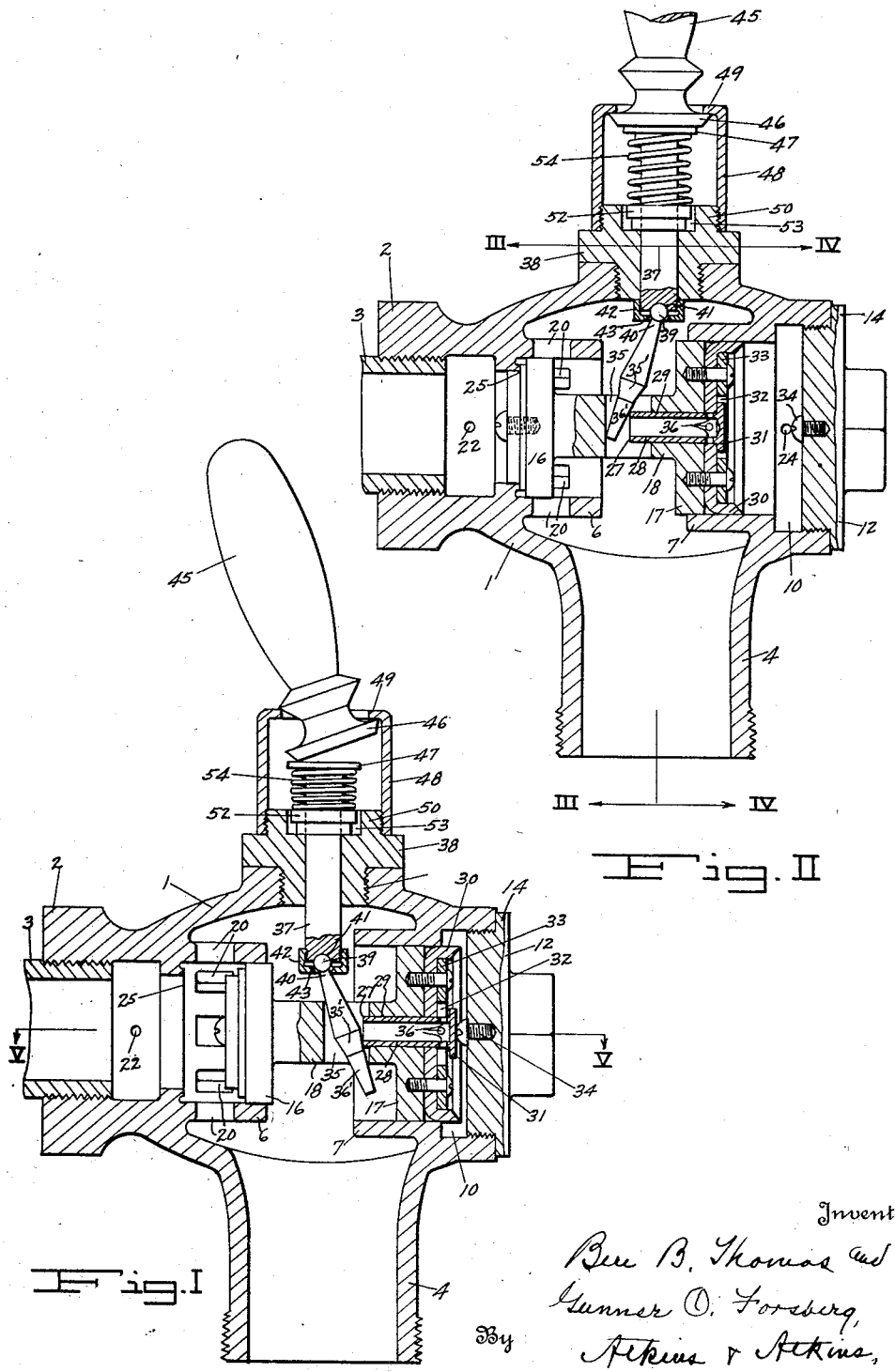

June 10, 1930.                B. B. THOMAS ET AL                1,763,188
                                FLUSHING VALVE
                          Filed Sept. 7, 1927      2 Sheets-Sheet 2
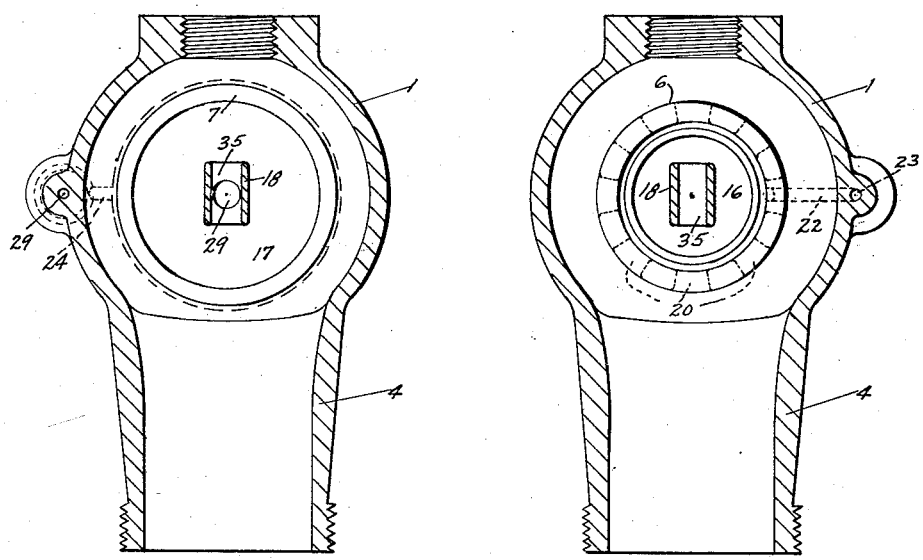
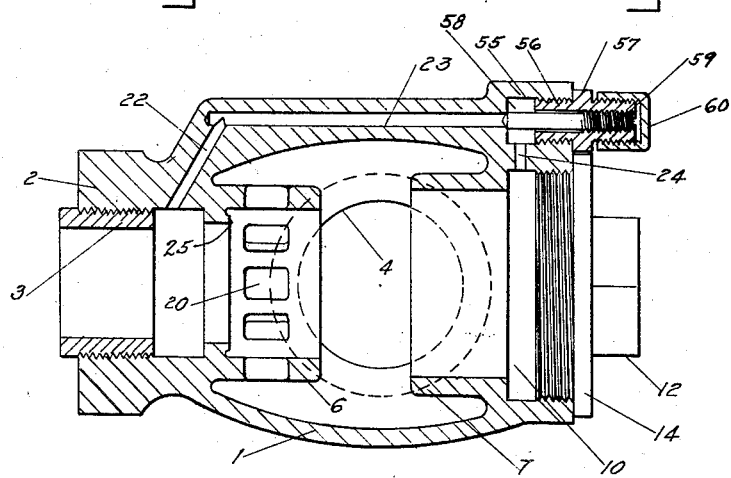
INVENTORS:
Ben B. Thomas and Gunnar O. Forsberg,
BY
Atkins & Atkins,
ATTORNEYS.

Patented June 10, 1930

1,763,188

UNITED STATES PATENT OFFICE

BEN B. THOMAS AND GUNNER O. FORSBERG, OF PORTLAND, OREGON

FLUSHING VALVE

Application filed September 7, 1927. Serial No. 218,042.

Our invention relates to valves, and has for its object the production of a novel flushing valve of the type in which its operation is effected, upon initiative manipulation, by pressure of the liquid whose delivery is controlled by the valve.

Our invention is designed to increase the efficiency of a valve of that description, to simplify its construction, and to facilitate the manipulation of it in the control of its operation.

What constitutes our invention will be hereinafter described in detail and succinctly defined in the appended claims.

In the accompanying drawings, which illustrate our invention in its present preferred form of embodiment, Figure I is a diametrical section of the valve-shell and its discharge outlet, and showing the working parts in the relative positions they assume under initial manipulation of the handle for opening the valve.

Figure II is a similar view of the valve-shell, showing the relative position of the working parts, when the valve is at rest in the closed position.

Figure III is a diametrical section on the line III—III of Figure II with portions of the mechanism omitted.

Figure IV is a view similar to Figure III, but looking in the opposite direction, being taken on the line IV—IV of Figure II.

Figure V is a section on the line V—V of Figure I, and made for the purpose of showing the course of the ducts for delivery of liquid pressure behind the main valve for the purpose of actuating it.

Referring to the numerals on the drawings, 1 indicates a valve shell or body having an inlet connection 2 to which a supply pipe is threaded or otherwise connected, and having a discharge outlet 4 disposed, for example, at right angles to the longitudinal axis of the connection 2.

The internal wall of the body 1 constitutes a barrel encompassing a valve guide 6 and a piston guide 7 which extend coaxially towards each other from substantially opposite ends of the barrel, respectively. The diameter of the valve guide 6 is less than that of the piston guide 7, for operative reasons hereinafter specified.

The piston guide 7 is open from end to end, and opens at its end opposite the connection 2 into a cylindrical recess 10 of enlarged diameter which, in use, is closed at its outer end, as by a screw plug 12, threaded into the wall of said recess, and provided with a stop piece, for example a peripheral flange 14. The bores of the guides 6 and 7 are fitted, respectively, with a suitably packed valve 16 and a piston head 17, which are united in properly spaced relationship, preferably by an intermediate stem 18 of reduced diameter, so as to constitute in one assemblage a piston-actuated valve.

The wall constituting the valve guide 6 is perforated at frequent intervals by ports 20 disposed in annular series, and which are alternately opened and closed by the reciprocation of the valve 16 in its guide.

The facial area of the valve 16 is smaller than that of the piston head 17, in order to render the valve 16 closable against the water under pressure in the pipe by pressure therefrom that is supplied behind the head 17. The pipe 3, through means of operative communication provided between the pipe 3 and the closed recess 10, supplies the said water under pressure. It is in accordance with the principle as just stated, well known in the art, and that the piston-actuated valve is made to close, and that the valve 16 and the piston head 17 are made of different relative diameters to fit the respective diameters of their guides 6 and 7 as already specified.

The means employed for effecting the communication last mentioned consists in effect of one duct, but that duct is for structural reasons made up, preferably, of a series of intercommunicating parts or branches 22, 23, and 24, as shown most completely in Figure V. Said duct is normally open throughout its longitudinal extent, and consequently, hydraulic pressure from the water confined in the pipe 3 and in said duct may be operatively communicated behind the piston head 17 within the confines of the plug-closed recess 10. Such pressure keeps the valve 16 normally seated against an annular valve seat 25, that is provided substantially at the forward end of its guide 6, and is preferably offset therefrom as illustrated clearly in Figure II, for instance.

Sufficient movement away from said position, such as is illustrated for instance in Figure I, of the valve 16 within its guide 6, will unseat the said valve from its seat 25, and permit flow of water from the pipe 3 through the ports 20 to the outlet 4. Movement in the opposite direction will reseat the valve.

The back and forth movements of the piston-actuated valve 16 are effected by the opening and closing, respectively, of a relief valve 27 that is carried by said piston-actuated valve, and preferably in the piston head 17 thereof. Consequently, flow of water through the duct aforesaid is controllable by means carried in the piston head 17.

The relief valve 27 preferably comprises a hollow guide stem 28 which snugly fits within a bore 29 extending through the piston head 17 and its packing cup 30. Said valve is provided with a stop head 31, whose face on its side next the stem 28 impinges against the surface of the cup 30 exposed at the bottom of a recess 32 in a metal disk 33 which holds the packing cup against the piston head 17. The recess 32 affords a countersinking effect for the head 31 in said disk, which is thereby made in effect the face of the piston head. The opening movement of the relief valve is limited by any suitable means, such for example, as by the impingement of its head 31 against a coaxially disposed set screw 34 that is provided in the plug 12.

The hollow guide stem 28 extends through and beyond the length of its bore 29 into a transverse aperture 35 that may be provided in the intermediate stem 18. The hollow of the guide stem 28 connects with cross-bores 36 which, by virtue of a slip-fit joint effected between the walls defining the opposite ends of the cross-bores and the wall of the bore 29 which surrounds the stem 28, constitute in effect the ports of the valve 27. The function performed by said joint is fortified by the seating of the head 31 against the packing cup 30, as aforesaid, but that is a mechanical detail which may be varied at will in the exercise of wise discretion.

By suitable manipulative means of control provided preferably outside of the body 1, the relief valve 27 may be actuated at will from its normal position in which it closes the ports 20, as shown in Figure II, to its open position as shown in Figure I. Such means of control preferably consists of a wedge-acting member 35' which fits loosely but snugly within the aperture 35, in which it is held ready for cooperative action with the hollow guide stem 28 by a tail piece 36'. The member 35' derives reciprocal movement from the descent of a plunger 37 mounted, for example, in a screw cap 38 which is preferably externally flanged and threaded into an annular opening provided for it in the top of the body 1. The inner end of the plunger 37 is operatively connected with the member 35', preferably by means of a universal joint connection, comprising a head 39 at the end of a shank 40 on the member 35', working loosely within a cavity 41, which may be formed, for convenience of assemblement, at the end of the plunger 37 by a screw cap 42 threaded to the end of the said plunger and provided with an internal annular flange 43 for the retention of the head 39 within the cavity 41.

Longitudinal movement is imparted to the plunger 37, preferably by a manipulation of a universal rocking-handle 45. The handle 45 is shown as having a base 46 by which it is confined in operative proximity to a flanged head 47 fixed to the outer end of the plunger 37. A case 48, which is of sufficient dimensions to accommodate the outthrust of the plunger and the rocking motion of the base 46, serves to confine the base 46 to its work. It is provided at its outer end with an internal annular flange 49, and is threaded at its other end to an extension 50 of the screw cap 38, as illustrated in Figures I and II. The plunger 37 preferably makes a slip fit within a collar 52 seated against the bottom of a recess 53 that is coaxial to the plunger 37.

Between the collar 52 and the head 47 of the plunger 37, there is confined about the plunger a coiled spring 54. Said spring tends to lift the plunger 37 to its normal position shown in Figure II, but, upon its compression by manipulation of the handle 45, allows endthrust of the plunger 37 to that position of it shown in Figure I, for the purpose of actuating the relief valve 27.

The duct branch 23 is preferably substantially parallel to the longitudinal axis common to the guides 6 and 7 in order to provide conveniently for the formation at one end thereof, of an enlarged extension 55 of the said duct branch for the threading into the outer end thereof of a nipple 56 having a medially disposed stop flange 57.

The nipple when in place, as shown in Figure V, is of a length to define a chamber 58 at the end of the duct branch 23 through which communication is established with the terminal branch duct 24. Into the bore of the nipple 56 is threaded an adjustment screw 59 which has a conical inner end that cooperates with a corresponding depression in the end of the duct branch 23, as shown in Figure V, with the effect of controlling the flow of water therethrough, and thereby regulating the time of the opening and closing movements of the piston head 17. A cover cap 60 is preferably threaded to the outer end of the nipple 56 for the purpose of protecting the end of the screw 59 against accident or unauthorized manipulation.

The operation of our device is deemed to be indicated to such extent in the foregoing specification as not to require further description.

What we claim is:

1. A self closing flushing valve, comprising the combination with a shell having an inlet connection, a piston-actuated valve therein having a valve and a piston head of different facial areas, and a stem provided with a transverse aperture uniting the valve and piston head, of means for supplying water thereto under pressure, a reciprocatory relief valve in the piston head having a hollow stem with ports extending into the transverse aperture aforesaid, a wedge acting member extending into said aperture and into operative connection with the relief valve stem, a yielding plunger in the shell operatively connected with the wedge acting member, and a rocking handle carried on the shell in operative connection with the plunger.

2. A self closing flushing valve, comprising the combination with a shell having an inlet connection, a piston-actuated valve therein having a valve and a piston head of different facial areas, and a stem provided with a transverse aperture uniting the valve and piston head, of means for supplying water thereto under pressure, a reciprocatory relief valve in the piston head having a hollow stem provided with ports extending into the transverse aperture aforesaid, a wedge acting member extending into said aperture and into operative connection with the relief valve stem, a yielding plunger in the shell operatively connected with the wedge acting member, a rocking handle carried on the shell in operative connection with the plunger, and a tail piece on the wedge acting member for holding said member in operative relationship with the relief valve stem.

3. A self-closing flushing valve, comprising the combination of a shell having inlet and outlet connections, a valve controlling the inlet connection and including a piston head of greater area than the valve seat, means for supplying water under pressure from the inlet connection to the piston head to hold the valve to its seat, a plunger extending through the shell, a member within the casing supported by the piston actuated valve and said plunger and connected with the latter by a universal joint, and a valve adapted to be rocked by said member to relieve the piston head of pressure as the plunger is moved inward.

In testimony whereof, we have hereunto set our hands.

BEN B. THOMAS.
GUNNER O. FORSBERG.